United States Patent
Kang et al.

(10) Patent No.: US 12,547,167 B2
(45) Date of Patent: Feb. 10, 2026

(54) APPARATUS AND METHOD FOR CONTROLLING EMERGENCY DRIVING SITUATION USING BRAIN WAVE

(71) Applicants: Hyundai Motor Company, Seoul (KR); Kia Motors Corporation, Seoul (KR); Sookmyung Women's University Industry-Academic Cooperation Foundation, Seoul (KR)

(72) Inventors: Jeong Su Kang, Seongnam-si (KR); Suh Yeon Dong, Seoul (KR)

(73) Assignees: Hyundai Motor Company, Seoul (KR); Kia Corporation, Seoul (KR); Sookmyung Women's University Industry-Academic Cooperation Foundation, Seoul (KR)

( * ) Notice: Subject to any disclaimer, the term of this patent is extended or adjusted under 35 U.S.C. 154(b) by 578 days.

(21) Appl. No.: 17/023,620

(22) Filed: Sep. 17, 2020

(65) Prior Publication Data

US 2021/0181734 A1    Jun. 17, 2021

(30) Foreign Application Priority Data

Dec. 12, 2019   (KR) .................. 10-2019-0165429

(51) Int. Cl.
*G05D 1/00* (2024.01)
*A61B 5/00* (2006.01)
*G08G 9/00* (2006.01)

(52) U.S. Cl.
CPC ......... *G05D 1/0016* (2013.01); *A61B 5/6814* (2013.01); *G08G 9/00* (2013.01)

(58) Field of Classification Search
CPC ...... G05D 1/00; G05D 1/0011; G05D 1/0016; A61B 5/00; A61B 5/02; A61B 5/16; A61B 5/24; A61B 5/37; A61B 5/68; A61B 5/74; A61B 5/7465; A61B 5/6801; A61B 5/6813; A61B 5/372; A61B 5/145; A61B 5/14542; A61B 5/18; A61B 5/316; A61B 5/369; A61B 5/6814; A61B 5/746; A61B 5/377;

(Continued)

(56) References Cited

U.S. PATENT DOCUMENTS

2004/0117098 A1* 6/2004 Ryu ................. B60K 28/06
                                                     303/121
2011/0279676 A1* 11/2011 Terada ............... A61B 5/369
                                                     348/148

(Continued)

FOREIGN PATENT DOCUMENTS

JP    2001245871 A  *  9/2001  ............... A61B 5/18
JP    2019199177 A     11/2019

(Continued)

*Primary Examiner* — Khoi H Tran
*Assistant Examiner* — Sarah A Tran
(74) *Attorney, Agent, or Firm* — Slater Matsil, LLP

(57) ABSTRACT

An emergency driving situation control apparatus using a brain wave signal includes a sensor configured to collect a brain wave signal for at least one passenger of a mobility in a predetermined channel region, an analyzer configured to determine, by analyzing the brain wave signal collected in the predetermined region, whether or not an emergency situation has occurred to the mobility, and a controller configured to control an operation of the mobility based on a result of the determination.

17 Claims, 8 Drawing Sheets

(58) Field of Classification Search
CPC ....... A61B 5/0205; A61B 5/374; A61B 5/747; A61B 2503/22; A61B 2503/00; A61B 2503/20; G06F 3/00; G06F 3/01; G06F 3/011; G06F 3/015; G08G 9/00; B60W 2040/00; B60W 2040/08; B60W 2040/0818; B60W 2040/0872; B60W 40/00; B60W 40/08; B60W 40/10; B60W 60/00; B60W 60/001; B60W 60/0015; B60W 60/0016; B60W 2050/00; B60W 2050/0001; B60W 2050/0043; B60W 2050/0057; B60W 2520/00; B60W 2520/04; B60W 50/00; B60W 50/08; B60W 30/18; B60W 30/18009; B60W 30/181; B60K 28/00; B60K 28/02; B60K 28/06; B60K 28/066; G08B 21/00; G08B 21/02; G08B 21/06

USPC ........................................................... 701/2
See application file for complete search history.

(56) References Cited

U.S. PATENT DOCUMENTS

| | | | | |
|---|---|---|---|---|
| 2017/0225677 | A1* | 8/2017 | Yoshida | A61B 5/6893 |
| 2017/0303842 | A1* | 10/2017 | Yoshida | B60W 50/14 |
| 2018/0154104 | A1* | 6/2018 | Gerdes | A61B 5/6814 |
| 2019/0161091 | A1* | 5/2019 | An | G05D 1/0061 |
| 2020/0245919 | A1* | 8/2020 | Chaumeil | A61B 5/7455 |
| 2021/0290132 | A1* | 9/2021 | Hendler | A61B 5/165 |
| 2022/0079507 | A1* | 3/2022 | Epelbaum | A61B 5/7235 |

FOREIGN PATENT DOCUMENTS

| | | | | |
|---|---|---|---|---|
| KR | 20180131045 A | | 12/2018 | |
| WO | WO-2015175435 A1 | * | 11/2015 | ........... A61B 5/0205 |

* cited by examiner

FIG. 4A
FIG. 4B
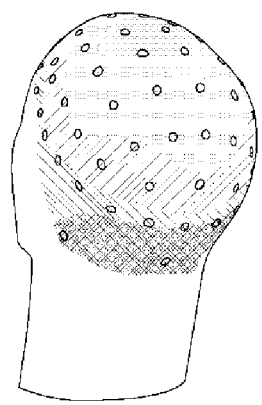
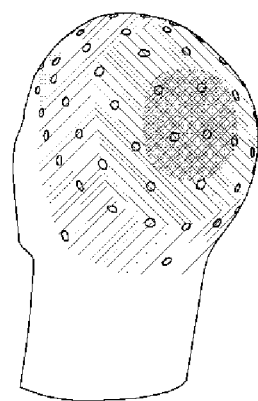
−9.3µN     −0.6µN
−1.8µN     13.0µN

APPARATUS AND METHOD FOR CONTROLLING EMERGENCY DRIVING SITUATION USING BRAIN WAVE

CROSS-REFERENCE TO RELATED APPLICATIONS

This application claims priority to Korean Patent Application No. 10-2019-0165429, filed on Dec. 12, 2019, which application is hereby incorporated herein by reference.

TECHNICAL FIELD

The present disclosure relates to a mobility controlling method and apparatus.

BACKGROUND

The statements in this section merely provide background information related to the present disclosure and may not constitute prior art.

As one of the transport means, a vehicle (or mobility) is a very important means and tool for living a life in the modern world. Furthermore, a mobility itself may be regarded as something special that gives meaning to someone.

As technology is advanced, functions provided by a mobility also gradually evolve. For example, in recent years, mobilities not only transport a passenger to a destination, but also meet a passenger's needs for faster and safer travel to a destination. In addition, new devices are being added to a mobility system in order to satisfy a passenger's aesthetic taste and comfort. In addition, the existing devices like steering wheels, transmissions and acceleration/deceleration devices are also being developed so that more functions can be provided to users.

Meanwhile, a brain-computer interface or a brain-machine interface is a field of controlling a computer or a machine according to a person's intention by using brain wave signals. ERP (Event-Related Potential) is closely related to cognitive functions.

SUMMARY

The present disclosure relates to a mobility controlling method and apparatus. Particular embodiments relate to a mobility controlling method and apparatus.

An embodiment of the present invention provides an apparatus and method for controlling an emergency driving situation of a mobility on the basis of a brain wave signal.

Another embodiment of the present invention provides an emergency driving situation control apparatus and method that control a mobility by determining a driving situation of the mobility on the basis of a brain wave signal obtained in a predetermined region of a driver.

The embodiments of the present disclosure are not limited to the above-mentioned embodiments, and other embodiments that are not mentioned will be clearly understood by those skilled in the art through the following descriptions.

According to embodiments of the present invention, an emergency driving situation control apparatus using a brain wave signal may be provided. The emergency driving situation control apparatus may include a sensor configured to collect a brain wave signal for at least one passenger of a mobility in a predetermined channel region, an analyzer configured to determine whether or not an emergency situation has occurred to the mobility by analyzing the brain wave signal collected from the predetermined region, and a controller configured to control an operation of the mobility on the basis of the determination result.

The predetermined channel region may include at least one of the periaqueductal gray (PAG) and the anterior cingulate cortex (ACC).

The brain wave signal may be a brain wave signal in a time series plane.

The analysis may include comparing a predetermined threshold with at least one of an amplitude and an activity of a brain wave signal collected in the predetermined channel region.

An amplitude of the brain wave signal may be a power spectrum of the brain wave signal at a specific frequency.

The analysis may include comparing a predetermined threshold with an amplitude of oxygen saturation collected in the predetermined channel region.

The analyzer may determine that an emergency situation has occurred to the mobility, when an amplitude of a brain wave signal collected in the predetermined channel region is equal to or greater than a predetermined threshold.

By analyzing an amplitude of oxygen saturation collected in the predetermined channel region, the analyzer may determine that an emergency situation has occurred to the mobility.

The analyzer may determine whether or not an emergency situation has occurred to the mobility by analyzing a brain wave signal collected in a region including the PAG.

The analyzer may determine that an emergency situation has occurred to the mobility when an activity level of a brain wave signal collected in a region including the PAG is equal to or greater than a first threshold.

The analyzer may adjust the first threshold on the basis of a comparison between an activity level of a brain wave signal collected in a region including the ACC and a second threshold.

When an activity level of a brain wave signal collected in a region including the ACC is equal to or greater than a second threshold, the analyzer may adjust the first threshold upwards by a predetermined ratio.

When an activity level of a brain wave signal collected in a region including the ACC is less than a second threshold, the analyzer may adjust the first threshold downwards by a predetermined ratio.

The analyzer may ultimately determine whether or not an emergency situation has occurred to the mobility by combining an analysis result for a brain wave signal collected in a region including the PAG and an analysis result for a brain wave signal collected in a region including the ACC.

When it is determined that an emergency situation has occurred to the mobility, the controller may limit the speed of the mobility to a predetermined magnitude and below.

When it is determined that an emergency situation has occurred to the mobility, the controller may transmit location information of the mobility to at least one of a preset user and a preset place.

When it is determined that an emergency situation has occurred to the mobility, the controller may stop the mobility.

The apparatus may further include a storage unit. When it is determined that an emergency situation has occurred to the mobility, the storage unit may store video driving information of the mobility obtained from a predetermined video apparatus.

The apparatus may further include a storage unit. When it is determined that an emergency situation has occurred to the mobility, the storage unit may store audio driving information of the mobility obtained from a predetermined audio apparatus.

In addition, according to embodiments of the present invention, an emergency driving situation control method using a brain wave signal may be provided. The emergency driving situation control method may include collecting a brain wave signal for at least one passenger of a mobility in a predetermined channel region, determining whether or not an emergency situation has occurred to the mobility by analyzing the brain wave signal collected from the predetermined region, and controlling an operation of the mobility on the basis of the determination result.

The predetermined channel region may include at least one of the periaqueductal gray (PAG) and the anterior cingulate cortex (ACC).

The brain wave signal may be a brain wave signal in a time series plane.

The analysis may include comparing a predetermined threshold with at least one of an amplitude and an activity of a brain wave signal collected in the predetermined channel region.

An amplitude of the brain wave signal may be a power spectrum of the brain wave signal at a specific frequency.

The analysis may include comparing a predetermined threshold with an amplitude of oxygen saturation collected in the predetermined channel region.

The determining of whether or not an emergency situation has occurred to the mobility may include determining that the emergency situation has occurred to the mobility, when an amplitude of a brain wave signal collected in the predetermined channel region is equal to or greater than a predetermined threshold.

The determining of whether or not an emergency situation has occurred to the mobility may include determining that the emergency situation has occurred to the mobility by analyzing an amplitude of oxygen saturation collected in the predetermined channel region.

The determining of whether or not an emergency situation has occurred to the mobility may include determining whether or not the emergency situation has occurred to the mobility by analyzing a brain wave signal collected in a region including the PAG.

The determining of whether or not an emergency situation has occurred to the mobility may include determining that the emergency situation has occurred to the mobility when an activity level of a brain wave signal collected in a region including the PAG is equal to or greater than a first threshold.

The determining of whether or not an emergency situation has occurred to the mobility may include adjusting the first threshold on the basis of a comparison between an activity level of a brain wave signal collected in a region including the ACC and a second threshold.

The determining of whether or not an emergency situation has occurred to the mobility may include adjusting the first threshold upwards by a predetermined ratio, when an activity level of a brain wave signal collected in a region including the ACC is equal to or greater than a second threshold.

The determining of whether or not an emergency situation has occurred to the mobility may include adjusting the first threshold downwards by a predetermined ratio, when an activity level of a brain wave signal collected in a region including the ACC is less than a second threshold.

The determining of whether or not an emergency situation has occurred to the mobility may include ultimately determining whether or not the emergency situation has occurred to the mobility by combining an analysis result for a brain wave signal collected in a region including the PAG and an analysis result for a brain wave signal collected in a region including the ACC.

When it is determined that an emergency situation has occurred to the mobility, the controlling of an operation of the mobility may include limiting the speed of the mobility to a predetermined magnitude and below.

When it is determined that an emergency situation has occurred to the mobility, the controlling of an operation of the mobility may include transmitting location information of the mobility to at least one of a preset user and a preset place.

When it is determined that an emergency situation has occurred to the mobility, the controlling of an operation of the mobility may include stopping the mobility.

When it is determined that an emergency situation has occurred to the mobility, storing video driving information of the mobility obtained from a predetermined video apparatus may be further included.

When it is determined that an emergency situation has occurred to the mobility, storing audio driving information of the mobility obtained from a predetermined audio apparatus may be further included.

The features briefly summarized above with respect to embodiments of the present disclosure are merely exemplary aspects of the detailed description below of embodiments of the present disclosure, and do not limit the scope of the present disclosure.

According to embodiments of the present invention, an apparatus and method for controlling an emergency driving situation of a mobility on the basis of a brain wave signal may be provided.

In addition, according to embodiments of the present invention, an emergency driving situation control apparatus and method may be provided which control a mobility by determining a driving situation of the mobility on the basis of a brain wave signal obtained in a predetermined region of a driver.

Effects obtained in embodiments of the present disclosure are not limited to the above-mentioned effects, and other effects not mentioned above may be clearly understood by those skilled in the art from the following description.

BRIEF DESCRIPTION OF THE DRAWINGS

In order that the disclosure may be well understood, there will now be described various embodiments thereof, given by way of example, reference being made to the accompanying drawings, in which:

FIGS. 4A and 4B are views respectively illustrating measurement areas of ERP and Pe in one embodiment of the present disclosure;

DETAILED DESCRIPTION OF ILLUSTRATIVE EMBODIMENTS

Figure 1:
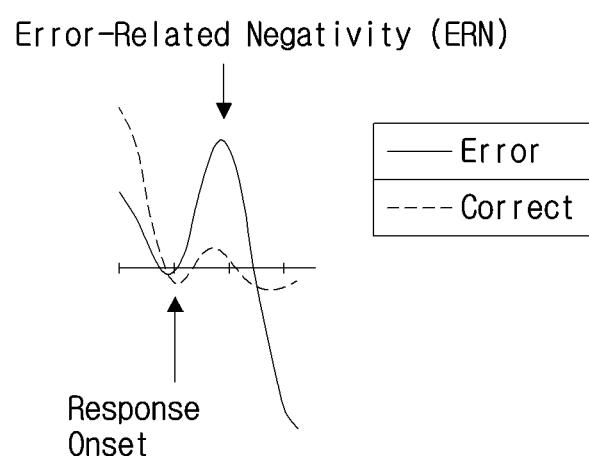
FIG. 1 is a view illustrating a general waveform of ERN in one embodiment of the present disclosure.

The following description is merely exemplary in nature and is not intended to limit the present disclosure, application, or uses. It should be understood that throughout the drawings, corresponding reference numerals indicate like or corresponding parts and features.

The following description is merely exemplary in nature and is not intended to limit the present disclosure, application, or uses. It should be understood that throughout the drawings, corresponding reference numerals indicate like or corresponding parts and features.

Exemplary embodiments of the present disclosure will be described in detail such that the ordinarily skilled in the art would easily understand and implement an apparatus and a method provided by embodiments of the present disclosure in conjunction with the accompanying drawings. However, the present disclosure may be embodied in various forms and the scope of the present disclosure should not be construed as being limited to the exemplary embodiments.

In describing embodiments of the present disclosure, well-known functions or constructions will not be described in detail when they may obscure the spirit of the present disclosure.

In embodiments of the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in embodiments of the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and are not used to show order or priority among elements. For instance, a first element discussed below could be termed a second element without departing from the teachings of the present disclosure. Similarly, the second element could also be termed as the first element.

In embodiments of the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure. Also, the terms, such as 'unit' or 'module', etc., should be understood as a unit that processes at least one function or operation and that may be embodied in a hardware manner (e.g., a processor), a software manner, or a combination of the hardware manner and the software manner.

In embodiments of the present disclosure, all of the constituent elements described in various forms should not be construed as being essential elements but some of the constituent elements may be optional elements. Accordingly, embodiments configured by respective subsets of constituent elements in a certain form also may fall within the scope of the present disclosure. In addition, embodiments configured by adding one or more elements to various elements also may fall within the scope of the present disclosure.

As an electrical activity of neurons constituting a brain, a brain wave signal (or brain signal, brain wave) means a bio signal that directly and indirectly reflects a conscious or nonconscious state of a person. A brain wave signal can be measured in every area of human scalp, and its wavelength has a frequency of mainly 30 Hz or below and a potential difference of scores of microvolts. Depending on brain activity and state, various waveforms may appear. Research on interface control using a brain wave signal according to a person's intention is under way. A brain wave signal may be obtained by using EEG (Electro Encephalo Graphy) using electrical signals caused by brain activities, MEG (Magneto Encephalo Graphy) using magnetic signals occurring with electrical signals, and fMRI (functional Magnetic Resonance Imaging) or fNIRS (functional Near-Infrared Spectroscopy) using a change of oxygen saturation in the blood. Although fMRI and fNIRS are useful techniques for measuring brain activities, fMRI has a low time-resolution and fNIRS has a low spatial-resolution in general. Due to these limitations, EEG signals are mostly used by virtue of excellent portability and time-resolution.

A brain wave signal changes spatially and over time according to brain activity. As a brain wave signal is usually difficult to analyze and its waveform is not easy to visually analyze, various processing methods are proposed.

For example, according to the number of oscillations (frequency), brain wave signals may be classified based on frequency bands (power spectrum classification). The classification considers a measured brain wave signal as a linear sum of simple signals at each specific frequency, decomposes the signal into each frequency component and indicates a corresponding amplitude. A brain wave signal at each frequency may be obtained by using pre-processing normally for noise elimination, the Fourier transform into frequency domain, and a band-pass filter (BPF).

More particularly, according to frequency band, brain waves may be classified into delta, theta, alpha, beta and gamma waves. Delta waves are brain waves with a frequency of 3.5 Hz or below and an amplitude of 20~200 pV, mainly appearing in normal deep sleep or newborns. In addition, delta waves may increase as our awareness of the physical world decreases. Generally, theta waves are brain waves with a frequency of 3.5~7 Hz, mainly appearing in emotionally stable states or in sleep.

In addition, theta waves are generated mainly in the parietal cortex and in the occipital cortex and may appear during calm concentration for recollecting a memory or meditating. Generally, alpha waves are brain waves with a frequency of 8~12 Hz, mainly appearing in relaxed and comfortable states. In addition, alpha waves are normally generated in the occipital cortex during rest and may diminish in sleep. Generally, beta waves are brain waves with a frequency of 13~30 Hz, mainly appearing in a state of tension, which is bearable enough, or while a certain level of attention is paid. In addition, beta waves are mainly generated in the frontal cortex and are related to an awakened state or concentrated brain activities, pathological phenomena and medicinal effects. Beta waves may appear in a wide area throughout the brain. In addition, specifically, the beta waves may be divided into SMR waves with a frequency of 13~15 Hz, mid-beta waves with a frequency of 15~18 Hz and high beta waves with a frequency of 20 Hz and above. As beta waves appear to be stronger under stress like anxiety and tension, they are called stress waves. Gamma waves are brain waves that generally have a frequency of 30~50 Hz, mainly appearing in a strongly excited state or during high-level cognitive information processing. In addition, gamma waves may appear in an awaking state of consciousness and during REM sleep and may also be overlapped with beta waves.

Each of the brain wave signals according to frequency band is associated with a specific cognitive function. For example, delta waves are associated with sleep, theta waves are associated with working memory, and alpha waves are associated with attention or inhibition. Thus, the property of a brain wave signal at each frequency band selectively displays a specific cognitive function. In addition, the brain wave signal at each frequency band may show a little different aspect in each measuring part on the surface of the head. The cerebral cortex may be divided into frontal cortex, parietal cortex, temporal cortex and occipital cortex. These parts may have a few different roles. For example, the occipital cortex corresponding to the back of head has the primary visual cortex and thus can primarily process visual information. The parietal cortex located near the top of head has the somatosensory cortex and thus can process motor/sensory information. In addition, the frontal cortex can process information related to memory and thinking, and the temporal cortex can process information related to auditory sense and olfactory sense.

Meanwhile, for another example, a brain wave signal may be analyzed by using ERP (Event-Related Potential). ERP is an electrical change in a brain in association with a stimulus from outside or a psychological process inside. ERP means a signal including an electrical activity of the brain, which is caused by a stimulus including specific information (for example, image, voice, sound, command of execution, etc.) after a certain time since the stimulus is presented.

To analyze an ERP, a process of separating a signal from a noise is desired. An averaging method may be mainly used. Particularly, by averaging brain waves measured based on stimulus onset time, it is possible to remove brain waves, which are not related to a stimulus, and to pick out only a related potential, that is, a brain activity commonly associated with stimulus processing.

As ERP has a high time resolution, it is closely related to research on cognitive function. ERP is an electrical phenomenon that is evoked by an external stimulus or is related to an internal state. According to types of stimuli, ERPs may be classified into auditory sense-related potentials, sight-related potentials, somatic sense-related potentials and olfactory sense-related potentials. According to properties of stimuli, ERPs may be classified into exogenous ERPs and endogenous ERPs. Exogenous ERPs have a waveform determined by an external stimulus, are related to automatic processing, and mainly appear in the initial phase of being given the stimulus. For example, exogenous ERPs are brainstem potentials. On the other hand, endogenous ERPs are determined by an internal cognitive process or a psychological process or state, irrespective of stimuli, and are related to 'controlled processing'. For example, endogenous ERPs are P300, N400, P600, CNV (Contingent Negative Variation), etc.

Names given to ERP peaks normally include a polarity and a latent period, and the peak of each signal has an individual definition and meaning. For example, the positive potential is P, the negative potential is N, and P300 means a positive peak measured about 300 ms after the onset of a stimulus. In addition, 1, 2, 3 or a, b, c and the like are applied according to the order of appearance. For example, P3 means a third positive potential in waveform after the onset of a stimulus.

Hereinafter, various ERPs will be described.

For example, N100 is related to a response to an unpredictable stimulus.

MMN (Mismatch Negativity) may be generated not only by a focused stimulus but also by a non-focused stimulus. MMN may be used as an indicator for whether or not a sense memory (echoic memory) operates before initial attention. P300, which will be described below, appears in a process of paying attention and making judgment, while MMN is analyzed as a process occurring in the brain before paying attention.

For another example, N200 (or N2) is mainly generated according to visual and auditory stimuli and is related to short-term memory or long-term memory, which are types of memories after attention, along with P300 described below.

For yet another example, P300 (or P3) mainly reflects attention to a stimulus, stimulus cognition, memory search and alleviation of uncertain feeling and is related to a perceptual decision distinguishing stimuli from outside. As the generation of P300 is related to a cognitive function, P300 is generated irrespective of types of presented stimuli. For example, P300 may be generated in auditory stimuli, visual stimuli and somatic stimuli. P300 is widely applied to research on the brain-computer interface.

For yet another example, N400 is related to language processing and is caused when a sentence or an auditory stimulus with a semantic error is presented. In addition, N400 is related to a memory process and may reflect a process of retrieving or searching information from long-term memory.

For yet another example, as an indicator showing reconstruction or recollective process, P600 is related to a process of processing a stimulus more accurately based on information stored in long-term memory.

For yet another example, CNV refers to potentials appearing for 200~300 ms and even for a few seconds in the later phase. It is also called slow potentials (SPs) and is related to expectancy, preparation, mental priming, association, attention and motor activity.

For yet another example, ERN (Error-Related Negativity) or Ne (error negativity) is an event-related potential (ERP) generated by a mistake or an error. It may occur when a subject makes a mistake in a sensorimotor task or a similar task. More particularly, when a subject cognizes a mistake or an error, ERN is generated and its negative peak appears mainly in the frontal and central zones for about 50~150 ms. Especially, it may appear in a situation where a mistake related to motor response is likely to occur, and may also be used to indicate a negative self-judgment.

Hereinafter, the major features of ERN will be described in more detail.

FIG. 1 is a view illustrating a general waveform of ERN according to one embodiment of the present disclosure.

Referring to FIG. 1, negative potential values are depicted above the horizontal axis, and positive potential values are depicted below the horizontal axis. In addition, it can be confirmed that an ERP with a negative peak value is generated within a predetermined time range after a response onset for an arbitrary motion. Herein, the response may mean a case where a mistake or an error is made (Error Response). In addition, the predetermined time range may be about 50~150 ms. Alternatively, the predetermined time range may be about 0~100 ms. Meanwhile, in the case of a correct response, an ERP is generated which has a relatively smaller negative peak than ERN.

As an ERP of initial negativity, ERN is time-locked until a response error occurs. In addition, ERN is known to reflect the reinforcement activity of a dopaminergic system related to behavioral monitoring. ERN includes the fronto-striatal loop including the rostral cingulate zone. Meanwhile, dopamine is associated with the reward system of brain that usually forms a specific behavior and motivates a person thereby providing pleasure and reinforced feelings. When a behavior obtaining an appropriate reward is repeated, it is learned as a habit. In addition, more dopamine is released through emotional learning, and a new behavior is attempted due to the release of dopamine. Thus, reward-driven learning is called reinforcement learning.

In addition, ERN may be generated in 0~100 ms after the onset of an erroneous response that is caused during an interference task (for example, Go-noGo task, Stroop task, Flanker task, and Simon task) through the frontal cortex lead.

In addition, together with CRN described below, ERN is known to reflect a general behavior monitoring system that can distinguish a right behavior and a wrong behavior.

In addition, the fact that ERN reaches a maximum amplitude at the frontal cortex electrode is known to reflect that an intracerebral generator is located in the rostral cingulate zone or the dorsal anterior cingulate cortex (dACC) zone.

In addition, ERN may show a change of amplitude according to a negative emotional state.

In addition, ERN may be reported even in a situation where behavioral monitoring is performed based on external evaluation feedback processing unlike internal motor expression, and may be classified as FRN described below.

In addition, ERN may be generated not only when having cognized a mistake or an error but also before cognizing the mistake or the error.

In addition, ERN may be generated not only as a response to his/her own mistake or error but also as a response to a mistake or error of others.

In addition, ERN may be generated not only as a response to a mistake or an error but also as a response to anxiety or stress for a predetermined performance task or object.

In addition, as a larger peak value of ERN is obtained, it may be considered as reflecting a more serious mistake or error.

Meanwhile, for yet another example, being an event-related potential (ERP) that is generated after ERN, Pe (Error Positivity) is an ERP with a positive value, which is generated mainly at the frontal cortex electrode in about 150~300 ms after a mistake or an error. Pe is known as a reaction that realizes a mistake or an error and pays more attention. In other words, Pe is related to an indicator of a conscious error information processing process after error detection. ERN and Pe are known as ERPs related to error monitoring.

Hereinafter, the major features of Pe will be described in more detail.

Figure 2:
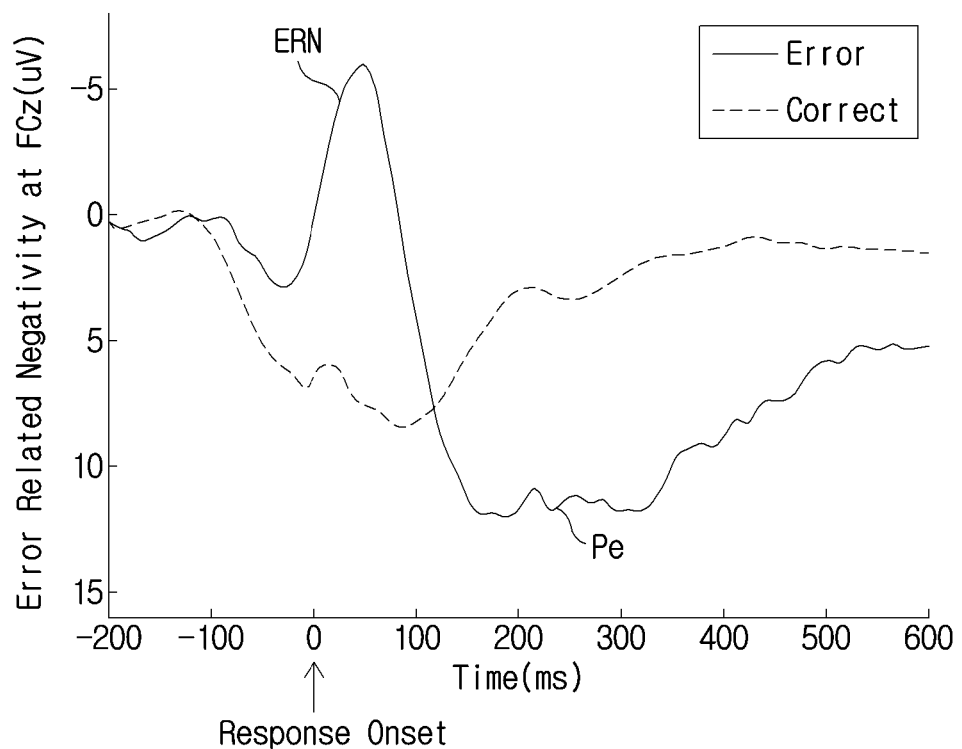
FIG. 2 is a view illustrating general waveforms of ERN and Pe according to one embodiment of the present disclosure.

FIG. 2 is a view illustrating general waveforms of ERN and Pe according to another embodiment of the present disclosure.

Referring to FIG. 2, negative potential values are depicted above positive potential values. In addition, it can be confirmed that an ERP with a negative peak value, that is an ERN, is generated within a first predetermined time range after a response onset for an arbitrary motion. Herein, the response may mean a case where a mistake or an error is made (Error Response). In addition, the first predetermined time range may be about 50~150 ms. Alternatively, the first predetermined time range may be about 0~200 ms.

In addition, it can be confirmed that an ERP with a positive peak value, that is a Pe, is generated within a second predetermined time range after the onset of the ERN. In addition, the second predetermined time range may be about 150~300 ms after an error onset. Alternatively, the second predetermined time range may mean about 200~400 ms.

Figure 3:
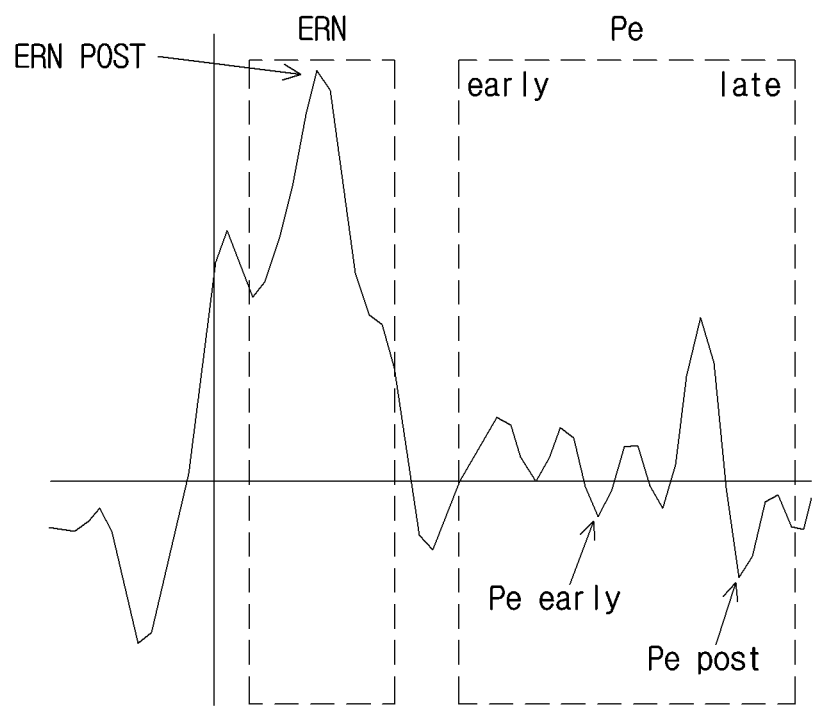
FIG. 3 is a view illustrating a deflection characteristic of Pe according to another embodiment of the present disclosure.

FIG. 3 is a view illustrating a deflection characteristic of Pe in one embodiment of the present disclosure.

Referring to FIG. 3, like P3, Pe has a wide deflection characteristic, and the plexus generator includes not only the areas of posterior cingulate cortex and insula cortex but also more anterior cingulate cortex.

In addition, Pe may reflect an emotional evaluation of an error and an attention to a stimulus like P300. In addition, ERN indicates a conflict between a right response and a wrong response, and Pe is known to be a response that realizes a mistake and pays more attention. In other words, ERN may be generated in a process of detecting a stimulus, and Pe may be generated depending on attention in a process of processing a stimulus. When ERN and/or Pe have relatively large values respectively, it is known that the values are related to an adaptive behavior intended to respond more slowly and more accurately after a mistake.

FIGS. 4A and 4B are views illustrating measurement areas of ERP and Pe according to one embodiment of the present disclosure.

ERN and Pe are known as ERPs related to error monitoring. Regarding the measurement areas of ERN and Pe, a largest negative value and a largest positive value may normally be measured in the central area. However, there may be a little difference according to measurement conditions. For example, FIG. 4A is the main area where ERN is measured, and the largest negative value of ERN may normally be measured in the midline frontal or central zone (that is, FCZ). In addition, FIG. 4B is the main area where Pe is measured, and a large positive value of Pe may normally be measured in a posterior midline zone as compared to ERN.

Meanwhile, for yet another example, FRN (Feedback-Related Negativity) is an event-related potential (ERP) that is related to error detection obtained based on external evaluation feedback. ERN and/or Pe detect an error based on an internal monitoring process. However, in the case of FRN, when being obtained based on external evaluation feedback, it may operate similarly to the process of ERN.

In addition, FRN and ERN may share many electrophysiological properties. For example, FRN has a negative peak value at the frontal cortex electrode in about 250~300 ms after the onset of a negative feedback and may be generated in the dorsal anterior cingulate cortex (dACC) zone like ERN.

In addition, like ERN, FRN may reflect an activity of reinforcement learning by a dopaminergic system. In addition, FRN normally has a larger negative value than a positive feedback and may have a larger value for an unforeseen case than for a predictable result.

Figure 5:
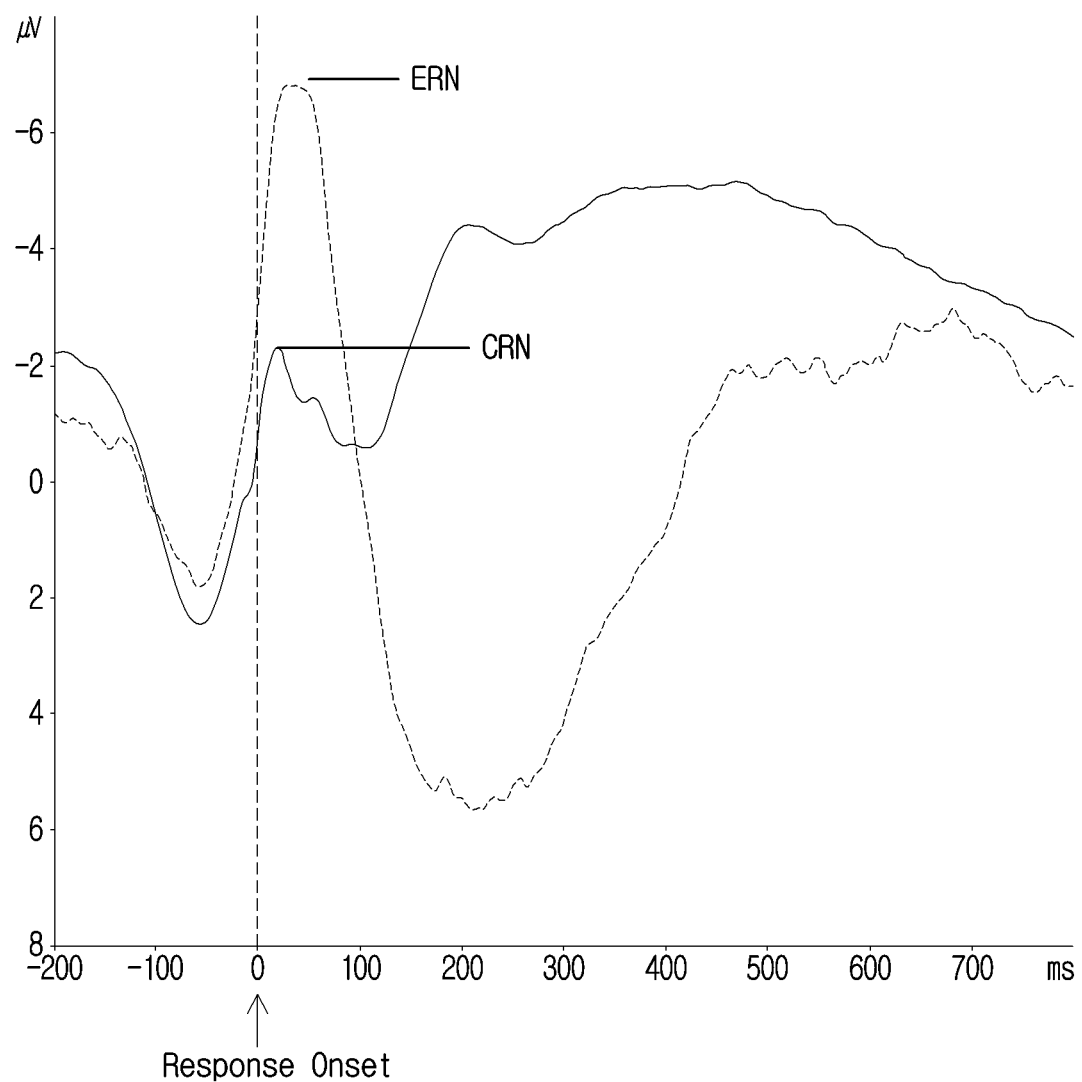
FIG. 5 is a view illustrating general waveforms of ERN and CRN according to one embodiment of the present disclosure.

For yet another example, CRN (Correct-Related Negativity) is an ERP generated by a correct trial and is a negative value that is smaller than ERN. Like ERN, CRN may be generated in the initial latent period (for example, 0~100 ms). FIG. 5 is a view illustrating general waveforms of ERN and CRN in one embodiment of the present disclosure.

For yet another example, Pc (Correct Positivity) is an event-related potential generated following CRN. It is an event-related potential generated in about 150~300 ms after the onset of correct response. The relation between CRN and Pc may be similar to the relation between ERN and Pe.

Meanwhile, ERPs may be classified into stimulus-locked ERPs and response-locked ERPs. The stimulus-locked ERPs and the response-locked ERPs may be divided according to criteria like evoking cause of ERP and response time. For example, an ERP evoked from a moment when a word or a picture is presented to a user from outside may be called a stimulus-locked ERP. In addition, for example, an ERP evoked from a moment when a user speaks or pushes a button may be called a response-locked ERP. Accordingly, based on the above-described criterion, in general, stimulus-locked ERPs are N100, N200, P2, P3, etc., and response-locked ERPs are ERN, Pe, CRN, Pc, FRN, etc.

Meanwhile, brain waves may be classified according to manifesting motives. Brain waves may be classified into spontaneous brain waves (spontaneous potentials) manifested by a user's will and evoked brain waves (evoked potentials) that are naturally manifested according to external stimuli irrespective of the user's will. Spontaneous brain waves may be manifested when a user moves on his/her own or imagines a movement, while evoked brain waves may be manifested by visual, auditory, olfactory and tactile stimuli, for example.

Meanwhile, brain wave signals may be measured in accordance with the International 10-20 system. The International 10-20 system determines measurement points of brain wave signals on the basis of the relationship between the location of an electrode and the cerebral cortex areas.

Figure 6:
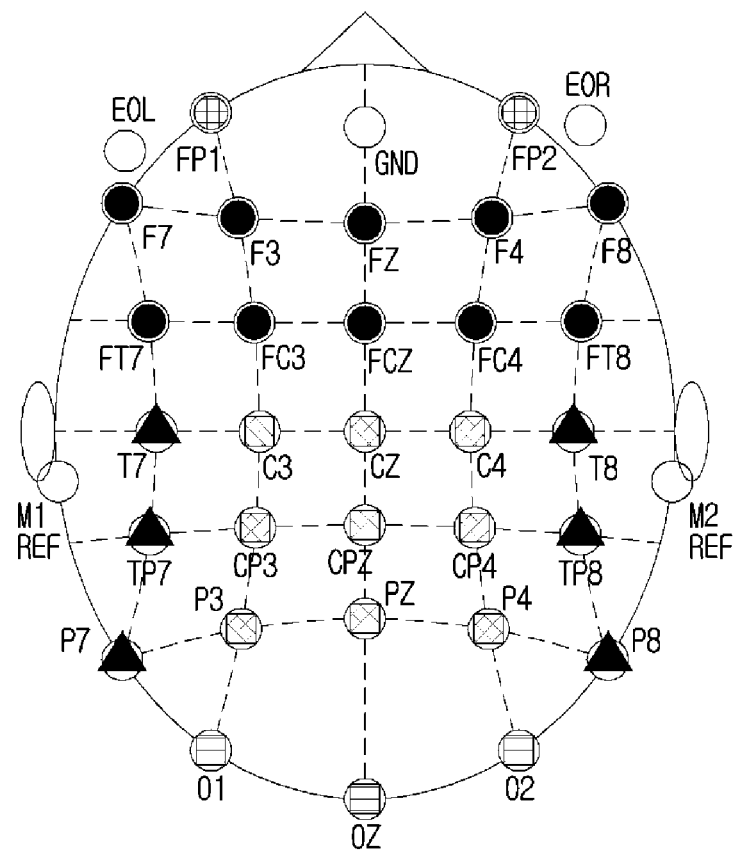
FIG. 6 is a view illustrating EEG measurement channels corresponding to cerebral cortex areas in one embodiment of the present disclosure.

FIG. 6 is a view illustrating EEG measurement channels corresponding to the cerebral cortex areas according to one embodiment of the present disclosure.

Referring to FIG. 6, brain areas (Prefrontal cortex FP1, FP2; Frontal cortex F3, F4, F7, F8, FZ, FC3, FC4, FT7, FT8, FCZ; Parietal cortex C3, C4, CZ, CP3, CP4, CPZ, P3, P4, PZ; Temporal cortex T7, T8, TP7, TP8, P7, P8; Occipital cortex O1, O2, OZ) correspond to 32 brain wave measurement channels. For each of the channels, data may be obtained and analysis may be performed for each cerebral cortex area by using the data.

Figure 7:
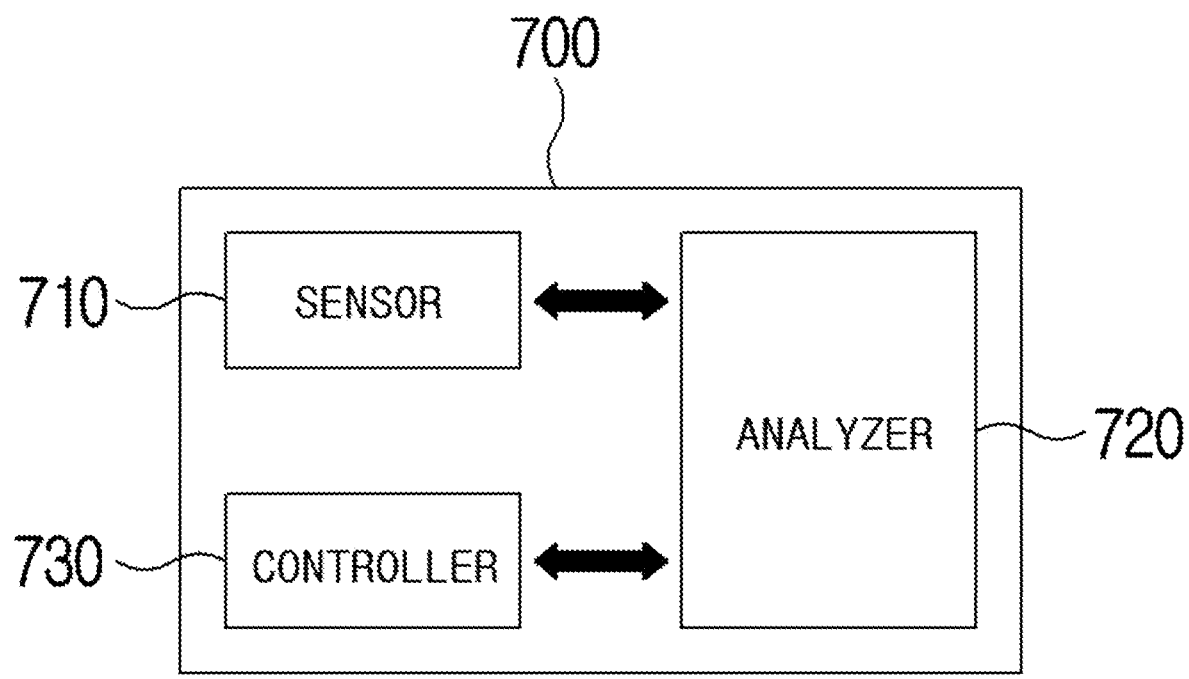
FIG. 7 is a block diagram illustrating a configuration of an apparatus for controlling an emergency driving situation occurring to a mobility on the basis of a driver's brain wave signal according to one embodiment of the present invention.

FIG. 7 is a block diagram illustrating a configuration of an apparatus for controlling an emergency driving situation of a mobility on the basis of a driver's brain wave signal according to one embodiment of the present invention.

As one type of phobic reaction, freezing may mean an involuntary interruption of a driver's physical movement, as if frozen, because of an object suddenly popping up or a sudden situation happening in the driver's view while a mobility is moving.

In other words, when an emergency situation occurs to a moving mobility, freezing may occur to a driver operating the mobility.

For example, when an object suddenly comes up to a driver's view, freezing may occur to the driver. Alternatively, when a brake pedal does not operate or an operational problem of a mobility occurs against a driver's intention, freezing may occur to the driver. Alternatively, when a threatening abnormality in body like a myocardial infarction occurs to a mobility driver and a sudden problem arises in driving the mobility, freezing may occur to the driver.

Meanwhile, it is known that whether or not the freeze response occurs may be determined based on a brain wave signal or brain activity measured in the periaqueductal gray (PAG). Herein, using a brain wave signal may be understood as one embodiment of methods for measuring and analyzing brain activity. Meanwhile, the brain activity may be obtained by other means like fMRI.

Herein, the PAG is a region known to be related to heart rate control. For example, it is known that a decrease in heart rate is related to the activation of brain wave signals in the PAG. In other words, as the occurrence of a freeze response (or freezing) is related to a decrease of heart rate, whether or not a freeze response occurs may be ultimately determined on the basis of an activity of brain wave signals in the PAG. For example, a decrease of heart rate may indicate that freezing occurs to a driver. In addition, for example, when an activity of brain wave signals measured in the PAG exceeds a predetermined criterion, it may mean a decrease in heart rate. Alternatively, for example, when an activity of brain wave signals measured in the PAG exceeds a predetermined criterion, it may mean that freezing occurs to a driver.

Here, the activity of brain wave signals may mean a brain activity.

In addition, herein, the predetermined criterion may be a predetermined threshold that is preset or set by a user input. Alternatively, the predetermined criterion may mean an activity of brain wave signals measured in a predetermined time section.

Meanwhile, the predetermined criterion may be set on the basis of a brain wave signal or a brain activity measured in the anterior cingulate cortex (ACC).

The ACC occupies a portion of the prefrontal cortex capable of the highest-level calculations. The ACC is known as a brain region that responds to a physical pain and processes pain-related information. For example, when a brain wave signal shows a low activity in the ACC, it is understood that freezing may occur more actively.

Accordingly, when an activity of brain wave signals measured in the ACC is relatively low, it is more likely to determine that freezing occurs. Thus, a predetermined threshold may be set to a relatively small value. Here, the threshold may mean a threshold used to analyze an activity of brain wave signals measured in the PAG. In other words, when a predetermined threshold in the PAG is set to a relatively low value, frequent freeze responses due to the suppression of ACC may be better detected.

Alternatively, when an activity of brain wave signals measured in the ACC is relatively high, it is less likely to determine that freezing occurs. Thus, a predetermined threshold may be set to a relatively large value. Here, the threshold may mean a threshold used to analyze an activity of brain wave signals measured in the PAG. In other words, when a predetermined threshold in the PAG is set to a relatively high value, a false positive (or false alarm), determining that freezing occurs while no such freezing occurs, may be prevented.

Thus, whether or not freezing occurs may be determined by analyzing an amplitude or activity of brain wave signals in the PAG and/or in the ACC.

Embodiments of the present disclosure may provide an apparatus and method for determining whether or not an emergency situation has occurred while a mobility is moving on the basis of a brain wave signal generated in a predetermined region of a driver. In addition, embodiments of the present disclosure may provide an apparatus and method for controlling an operation of the mobility on the basis of a result of the determination.

FIG. 7 is a block diagram illustrating a configuration of an apparatus for controlling an emergency driving situation occurring to a mobility on the basis of a driver's brain wave signal according to one embodiment of the present invention.

Referring to FIG. 7, an emergency driving situation control apparatus 700 may include a sensor 710, an analyzer 720, a controller 730 and/or a storage unit (not illustrated). It should be noted, however, that only some of the components necessary for explaining the present embodiment are shown, and the components included in the emergency driving situation control apparatus 700 are not limited to the above-described example. For example, two or more constituent units may be implemented in one constituent unit, and an operation performed in one constituent unit may be divided and executed in two or more constituent units. Also, some of the constituent units may be omitted or additional constituent units may be added.

An emergency driving situation control apparatus and/or method using a brain wave signal according to embodiments of the present disclosure may collect a brain wave signal for at least one passenger of a mobility in a predetermined channel region. In addition, an emergency driving situation control apparatus of embodiments of the present disclosure may determine whether or not an emergency situation has occurred to the mobility by analyzing the collected brain wave signal. In addition, an emergency driving situation control apparatus of embodiments of the present disclosure may control an operation of the mobility on the basis of a result of the determination.

Particularly, the emergency driving situation control apparatus 700 of embodiments of the present disclosure may collect a brain wave signal for at least one passenger of a mobility in a predetermined channel region. In addition, the sensor 710 may perform the operation.

Here, the brain wave signal may mean a brain wave signal in a time series plane.

In addition, the brain wave signal may mean a brain wave signal at each frequency. In addition, the brain wave signal may mean an amplitude of a brain wave signal at each frequency. In addition, the amplitude of the brain wave signal at each frequency may mean a power of a frequency band within a predetermined range. In other words, the amplitude of the brain wave signal at each frequency may mean a power that is obtained by converting, for example, measured signals by Fourier transform into a frequency band in a frequency domain.

In addition, the brain wave signal may include an oxygen saturation in a predetermined region.

Here, the predetermined channel region may include a region including the PAG and/or a region including the ACC.

In addition, an emergency driving situation control apparatus 700 of embodiments of the present disclosure may determine whether or not an emergency situation has occurred to the mobility by analyzing the collected brain wave signal. In addition, the analyzer 720 may perform the operation.

Herein, the analysis may include comparing an amplitude of a brain wave signal collected in the predetermined channel region and a predetermined threshold. In addition, the analysis may include comparing an amplitude of a brain wave signal, which is collected for the predetermined time in a predetermined channel region, and a predetermined threshold. Here, the amplitude of the brain wave signal may mean a power spectrum of the brain wave signal at a specific frequency.

In addition, the analysis may include comparing an amplitude of oxygen saturation collected in the predetermined channel region and a predetermined threshold.

Here, the threshold may be a preset value or a value input by a user. In addition, the threshold may be different for each driver from whom a brain wave signal is collected. For example, it may be a value reflecting the brain wave signal characteristic of each driver. In order to reflect an analysis result of the brain wave signal characteristic, a predetermined learning process may be performed in advance for characteristics displayed in a driver's brain wave signal. In addition, the threshold may have multiple threshold values.

Here, the threshold may be a statistical value of a brain wave signal for which prior learning is performed according to drivers.

Meanwhile, the analysis may include extracting a brain wave signal at each frequency.

In addition, a brain wave signal at each frequency that is used for the analysis may be a statistical value of a brain wave signal collected for a predetermined time. For example, the statistical value may mean an average value, a weighted average value, a maximum value and a minimum value.

In addition, the analysis may determine a driver's state from a point where an amplitude of a brain wave signal is equal to or greater than a predetermined threshold.

In addition, the analysis may determine a driver's state from a point where an amplitude of oxygen saturation in a predetermined region is equal to or greater than a predetermined threshold.

Herein, the analysis may include comparing an amplitude of a brain wave signal at each frequency, which is collected for the predetermined time, and a predetermined threshold.

For example, when the collected brain wave signal is equal to or greater than a predetermined threshold, it may be determined that an emergency situation has occurred to a mobility.

For another example, when the collected brain wave signal is equal to or greater than a predetermined percentage of a predetermined threshold, it may be determined that an emergency situation has occurred to a mobility. For example, when the collected brain wave signal is equal to or greater than 150% of a predetermined threshold, it may be determined that an emergency situation has occurred to a mobility. In other words, when a drastic change of brain wave signals collected in a predetermined region is detected, an emergency situation may be determined to occur to a mobility.

For yet another example, when a brain wave signal collected in a region including the PAG and/or in a region including the ACC is equal to or greater than a predetermined threshold, it may be determined that an emergency situation has occurred to a mobility.

For yet another example, when a brain wave signal collected in a region including the PAG and/or in a region including the ACC is equal to or greater than a predetermined threshold by a certain percentage, it may be determined that an emergency situation has occurred to a mobility.

The emergency driving situation control apparatus 700 of embodiments of the present disclosure may control an operation of the mobility on the basis of a result of the determination. In addition, the controller 730 may perform the operation.

Here, the mobility may include a predetermined apparatus. For example, the predetermined apparatus may include a driving apparatus, a steering apparatus, a pedal apparatus (an accelerator pedal, a brake pedal), a transmission, a video system, an audio system, a transceiver, a navigation system, and other mobility manipulation devices.

When it is determined that an emergency situation has occurred to the mobility, the speed of the mobility may be limited to a predetermined magnitude and below by controlling a driving apparatus and the like in the mobility. In addition, a power and/or a torque of the mobility may be limited to a predetermined magnitude and below. For example, even when a driver unintentionally steps on an accelerator pedal, the speed of the mobility may be limited to a predetermined magnitude and below.

For another example, when it is determined that an emergency situation has occurred to a mobility, the location information of the mobility may be transmitted to a preset user or a preset place (for example, an emergency room, 911 call center, etc.) by controlling a transceiver of the mobility.

For yet another example, when it is determined that an emergency situation has occurred to a mobility, the mobility may be led to have an emergency stop by controlling a driving apparatus. For example, even when a driver does not push down on a brake pedal or has no intention to push down on a brake pedal, a mobility may be led to have an emergency stop.

For yet another example, when it is determined that an emergency situation has occurred to a mobility, video driving information of the mobility obtained from the predetermined video apparatus may be stored. In addition, the storage unit (not illustrated) may perform the operation.

For yet another example, when it is determined that an emergency situation has occurred to a mobility, audio driving information of the mobility obtained from the predetermined audio apparatus may be stored. In addition, the storage unit (not illustrated) may perform the operation.

Meanwhile, while controlling a mobility by determining whether or not an emergency situation has occurred to the mobility on the basis of an analysis of a driver's brain wave signal, an emergency driving situation control apparatus of embodiments of the present disclosure may update a predetermined threshold and a predetermined ratio that are used for the analysis. In other words, a brain wave signal of the driver, information on whether or not an emergency situation occurs to a mobility, a mobility control operation, a preset threshold and/or a ratio may be added as learning data in order to set the predetermined threshold and the predetermined ratio.

Figure 8:
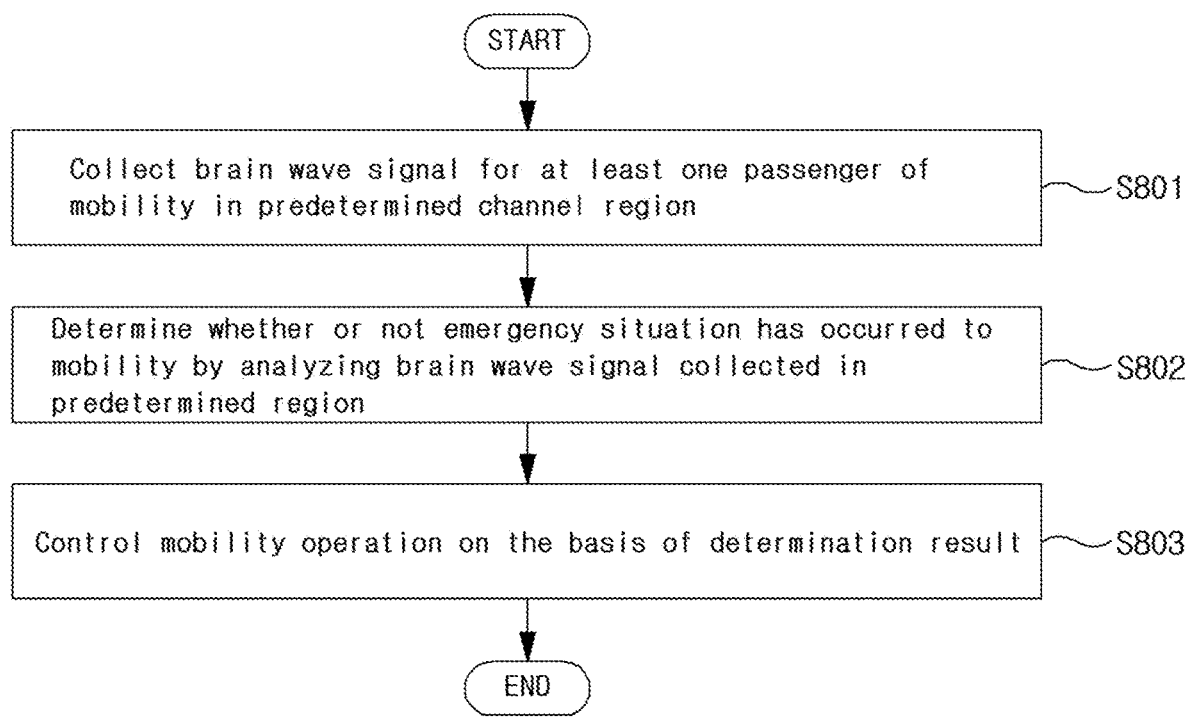
FIG. 8 is a flowchart illustrating a method of operating an apparatus that controls an emergency driving situation occurring to a mobility according to one embodiment of the present invention.

FIG. 8 is a flowchart illustrating a method of operating an apparatus that controls an emergency driving situation occurring to a mobility according to one embodiment of the present invention.

In the step S801, a brain wave signal for at least one passenger of a mobility may be collected in a predetermined channel region.

Here, the predetermined channel region may include at least one of the periaqueductal gray (PAG) and the anterior cingulate cortex (ACC).

Here, the brain wave signal may be a brain wave signal in a time series plane. In addition, the brain wave signal may mean a brain wave signal at each frequency. In addition, the brain wave signal may mean an amplitude of a brain wave signal at each frequency. In addition, the amplitude of the brain wave signal may mean a power spectrum of the brain wave signal at a specific frequency.

In the step S802, by analyzing a brain wave signal collected in the predetermined region, it may be determined whether or not an emergency situation has occurred to a mobility.

Here, the analysis may include comparing a predetermined threshold and at least one of an amplitude and an activity of a brain wave signal collected in the predetermined channel region.

Here, the determining of whether or not an emergency situation has occurred to the mobility may mean determining that the emergency situation has occurred to the mobility when an amplitude of a brain wave signal collected in the predetermined channel region is equal to or greater than a predetermined threshold. In addition, it may mean determining that an emergency situation has occurred to the mobility by analyzing an amplitude of oxygen saturation collected in a predetermined channel region. In addition, by analyzing a brain wave signal collected in a region including the PAG, it may mean determining whether or not an emergency situation has occurred to the mobility. In addition, by analyzing a brain wave signal collected in a region including the PAG, it may mean determining whether or not an emergency situation has occurred to the mobility. In addition, it may mean ultimately determining whether or not an emergency situation has occurred to the mobility by combining an analysis result for a brain wave signal collected in a region including the PAG and an analysis result for a brain wave signal collected in a region including the ACC.

For example, when an activity level of a brain wave signal collected in a region including the PAG is equal to or greater than a first threshold, it may be determined that an emergency situation has occurred to the mobility.

In addition, the first threshold may be adjusted on the basis of a comparison between an activity level of a brain wave signal collected in a region including the ACC and a second threshold. For example, when an activity level of a brain wave signal collected in a region including the ACC is equal to or greater than a second threshold, the first threshold may be adjusted upwards by a predetermined ratio. In addition, when an activity level of a brain wave signal collected in a region including the ACC is less than a second threshold, the first threshold may be adjusted downwards by a predetermined ratio.

In the step S803, an operation of a mobility may be controlled based on a determination result.

Herein, when it is determined that an emergency situation has occurred to the mobility, the controlling of an operation of the mobility may include limiting the speed of the mobility to a predetermined magnitude and below. In addition, when it is determined that an emergency situation has occurred to the mobility, the controlling of an operation of the mobility may include transmitting location information of the mobility to at least one of a preset user and a preset place. In addition, when it is determined that an emergency situation has occurred to the mobility, the controlling of an operation of the mobility may include stopping the mobility. In addition, when it is determined that an emergency situation has occurred to the mobility, storing video driving information of the mobility obtained from a predetermined video apparatus may be included. In addition, when it is determined that an emergency situation has occurred to the mobility, storing audio driving information of the mobility obtained from a predetermined audio apparatus may be included.

Effects obtained in embodiments of the present disclosure are not limited to the above-mentioned effects, and other effects not mentioned above may be clearly understood by those skilled in the art from the foregoing description.

Although exemplary methods of embodiments of the present disclosure are described as a series of operation steps for clarity of a description, the present disclosure is not limited to the sequence or order of the operation steps described above. The operation steps may be simultaneously performed, or may be performed sequentially but in different order. In order to implement the method of embodiments of the present disclosure, additional operation steps may be added and/or existing operation steps may be eliminated or substituted.

Various embodiments of the present disclosure are not presented to describe all of the available combinations but are presented to describe only representative combinations. Steps or elements in various forms may be separately used or may be used in combination.

In addition, various embodiments of the present disclosure may be embodied in the form of hardware, firmware, software, or a combination thereof. When an embodiment of the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various forms to be executed in an apparatus or on a computer, and a non-transitory computer-readable medium storing such software or machine-executable instructions so that the software or instructions can be executed in an apparatus or on a computer.

The description of embodiments of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An emergency driving situation control apparatus using a brain wave signal, the apparatus comprising:
    a sensor configured to collect the brain wave signal for at least one passenger of a mobility in a first channel region and a second channel region different than the first channel region;
    an analyzer configured to determine, by analyzing the brain wave signal collected in the first channel region based on a predetermined threshold, whether or not an emergency situation has occurred to the mobility, wherein the analyzer is configured to:
    adjust the predetermined threshold based on a comparison between an activity level of the brain wave signal collected in the second channel region and a second threshold different from the predetermined threshold, wherein the second threshold is used to analyze the activity level of the brain wave signal collected in the second channel region,
    determine whether a freeze response has occurred to the passenger based on the brain wave signal collected in the first channel region and the adjusted predetermined threshold, and
    determine whether the emergency situation has occurred to the mobility based on a result of determining whether the freeze response has occurred to the passenger; and
    a controller configured to control an operation of the mobility based on a result of determining whether the emergency situation has occurred.

2. The apparatus of claim 1, wherein the analyzer is configured to analyze at least one of an amplitude and an activity level of the brain wave signal collected in the first channel region and the adjusted predetermined threshold to determine whether or not the emergency situation has occurred to the mobility.

3. The apparatus of claim 1, wherein the analyzer is configured to determine that the emergency situation has occurred to the mobility when an amplitude of the brain wave signal collected in the first channel region is equal to or greater than the adjusted predetermined threshold.

4. The apparatus of claim 1, wherein the analyzer is configured to determine that the emergency situation has occurred to the mobility by analyzing an amplitude of oxygen saturation collected in the first channel region.

5. The apparatus of claim 1, wherein the first channel region is a periaqueductal gray (PAG) and the second channel region is an anterior cingulate cortex (ACC).

6. The apparatus of claim 5, wherein the analyzer is configured to determine that the emergency situation has occurred to the mobility when an activity level of the brain wave signal collected in the PAG is equal to or greater than a first threshold.

7. The apparatus of claim 5, wherein the analyzer is configured to adjust the predetermined threshold based on a comparison between an activity level of the brain wave signal collected in the ACC and a second threshold.

8. The apparatus of claim 1, wherein, when it is determined that the emergency situation has occurred to the mobility, the controller is configured to limit a speed of the mobility to a predetermined magnitude and below.

9. The apparatus of claim 1, wherein, when it is determined that the emergency situation has occurred to the mobility, the controller is configured to transmit location information of the mobility to at least one of a preset user and a preset place.

10. An emergency driving situation control method using a brain wave signal, the method comprising:
    collecting the brain wave signal for at least one passenger of a mobility in a first channel region and in a second channel region different from the first channel region;
    determining whether a freeze response has occurred to the passenger by analyzing the brain wave signal collected in the first channel region based on a predetermined threshold that has been adjusted based on a comparison between an activity level of the brain wave signal collected in the second channel region and a second threshold different from the predetermined threshold, wherein the second threshold is used to analyze the activity level of the brain wave signal collected in the second channel region;

determining whether an emergency situation has occurred to the mobility based on a result of determining whether the freeze response has occurred to the passenger; and controlling an operation of the mobility based on a result of the determination of whether the emergency situation has occurred to the mobility.

11. The method of claim 10, wherein determining whether or not the emergency situation has occurred to the mobility comprises comparing at least one of an amplitude and an activity level of the brain wave signal collected in the first channel region and the predetermined threshold.

12. The method of claim 10, wherein determining whether or not the emergency situation has occurred to the mobility comprises determining that the emergency situation has occurred to the mobility when an amplitude of the brain wave signal collected in the first channel region is equal to or greater than a second predetermined threshold.

13. The method of claim 10, wherein determining whether or not the emergency situation has occurred to the mobility comprises determining that the emergency situation has occurred to the mobility by analyzing an amplitude of oxygen saturation collected in the first channel region.

14. The method of claim 10, wherein, when it is determined that the emergency situation has occurred to the mobility, controlling the operation of the mobility comprises limiting a speed of the mobility to a predetermined magnitude and below.

15. The method of claim 10, wherein, when it is determined that the emergency situation has occurred to the mobility, controlling the operation of the mobility comprises transmitting location information of the mobility to at least one of a preset user and a preset place.

16. An emergency driving situation control method using a brain wave signal, the method comprising:

collecting the brain wave signal for at least one passenger of a mobility in a first channel region and a second channel region, wherein the first channel region is a periaqueductal gray (PAG) and the second channel region is an anterior cingulate cortex (ACC);

determining that a freeze response might have occurred to the passenger by analyzing the brain wave signal collected in the first channel region in view of a predetermined threshold;

adjusting the predetermined threshold based on a comparison between an activity level of the brain wave signal collected in the second channel region and a second threshold different from the predetermined threshold, wherein the second threshold is used to analyze the activity level of the brain wave signal collected in the second channel region;

determining whether the freeze response has occurred to the passenger by analyzing the brain wave signal collected in the first channel region in view of the adjusted predetermined threshold;

determining whether an emergency situation has occurred to the mobility based on a result of determining whether the freeze response has occurred to the passenger; and controlling an operation of the mobility based on a result of determining whether the emergency situation has occurred.

17. The method of claim 16, wherein determining whether or not the emergency situation has occurred to the mobility comprises determining that the emergency situation has occurred to the mobility when an activity level of the brain wave signal collected in the PAG is equal to or greater than a first threshold.

* * * * *